UNITED STATES PATENT OFFICE.

THE BARRONS PATENT STEEL MANUFACTURING COMPANY, OF NEW YORK, N. Y., ASSIGNEES OF JOHN F. BOYNTON.

IMPROVEMENT IN CONVERTING IRON INTO STEEL.

Specification forming part of Letters Patent No. 66,785, dated July 16, 1867; Reissue No. 3,222, dated December 1, 1868.

*To all whom it may concern:*

Be it known that JOHN F. BOYNTON, of Syracuse, in the county of Onondaga and State of New York, did invent a new and useful Improvement in the Method of Converting Iron into Steel, and of expelling from iron its impurities, such as sulphur, arsenic, phosphorus, and other substances easily evaporated, with which iron combines; and that the BARRONS PATENT STEEL MANUFACTURING COMPANY, (a corporation established by the laws of the State of New York,) by an assignment dated September 17, 1868, and duly recorded in the Patent Office, has become the owner of the entire interest in said invention; and the said BARRONS PATENT STEEL MANUFACTURING COMPANY, by Nathan Randall, its president, duly authorized to represent it, does hereby declare that the following is a full, clear, and exact description of said improvement.

The nature of the invention aforesaid consists in passing a current of carbureted-hydrogen gas, carbonic-oxide gas, carbonized air, or other gases carbonized, over iron in a highly-heated state, as hereinafter described.

The iron to be operated upon is placed in a tight oven or chamber, and heated therein to nearly a welding heat. Into one side or end of this chamber or oven a jet of carbonized gas or air, produced by any of the methods hereinafter described, is introduced through a common gas-pipe, and from the opposite side or end the unconsumed gas, and new gases formed in the oven, escape through a similar pipe.

A number of induction and eduction pipes may be used in the same oven. As the gas passes through the oven or chamber over and around the heated iron, the carbon contained in it combines with the iron, converting it into steel or steely iron, and at the same time the impurities in the iron, such as sulphur, arsenic, phosphorus, and the like, will be expelled therefrom, and pass off with the residuum of gas through the eduction pipe or pipes.

If the escaping gas be lighted it will be found to burn with very little illumination, thus showing that it has been deprived of its carbon in passing through the oven, and by this means it will always be easy to ascertain whether the requisite quantity of gas is introduced, as, if the escaping gas burns with a bright light, it may be known that more gas is passing through the oven than will give up its carbon to the iron.

As gas containing a large amount of carbon will be the most efficient, it is preferred to use a gas carbureted by being first passed through a carbonizing-vessel, and then enriched by being mixed or combined with the vapors of hydrocarbons, according to any of the known processes of producing that result.

When the heavy hydrocarbons are heated to their points of evaporation, their vapors combine with gases as readily as those of the lighter ones, and are carried forward to the point of use, and as the products of gas-tar are among the richest in carbon, they are among the most valuable for carbureting gas to manufacture steel according to my process; and as the vapors of oils contain few impurities, the steel made by the use of them resembles cast-steel, while steel produced by charcoal heated in an oven in contact with iron is liable to contain the impurites of the charcoal used, or to be modified by the silex, soda, potash, lime, and other earthy substances contained in the charcoal.

Iron may be heated in contact with carbureted gases until perfectly converted into steel, and then, by increasing the heat, it may be melted and drawn off into molds, forming ingots, and when so formed will be free from bubbles, flaws, and impurities, and will be finer-grained than when made in the ordinary way.

Atmospheric air may be, in like manner, used for conveying hydrocarbon vapors through a converting-oven, in which case the oxygen combines with a portion of the hydrogen to form water, which is passed out through the vents in the form of steam, mingled with a trace of carbonic oxide, while the nitrogen will assist the carbon to combine with the iron and convert it into steel.

Hydrocarbon vapors may, in like manner, be forced through the converting-oven without admixture with either gases or air, and will produce the desired effect.

The length of time during which the heated iron should be subjected to the process of passing the gas over it will depend in some degree upon the size of the bars or pieces of iron to be operated upon; but the inventor has found, by experiment, that hoop-iron one-eighth of an inch in thickness will be converted into steel in about one hour, and that the gas consumed will not exceed three and a half feet to the pound of iron operated upon, if the gas be sufficiently charged with carbon.

No particular form of oven or chamber for carrying this process into effect is claimed, as any kind of a tight chamber in which the iron can be sufficiently heated, and through which a current of gas can be conducted, will answer the purpose.

Other gases, such as carbonic acid, nitrogen, and ammoniacal gases, may be used instead of carbureted-hydrogen and carbonic-oxide gas, if sufficiently charged with carbon by being first passed through a carbonizing-vessel, as above described, and then combined with hydrocarbon vapors.

When it is desired to convert one portion only of a piece of iron into steel, this may be done by coating that portion not to be converted with a wash made of silicate of alumina or silicic acid, or both combined, mingled with lime or other alkaloid substance, which will prevent the portion so coated from being converted into steel.

In a similar way that sulphur is expelled from iron by carbureted hydrogen or hydrogen gas carbonized, so oxygen may be removed from oxides of iron. The oxygen, combining with the hydrogen, forms water, and escaping as highly-heated steam, the oxide of iron is thus reduced to metallic iron, and the carbon of the gas, uniting with the metallic iron, converts it into steel. When this is effected the iron will be converted into sponge-steel, and in this state can be pressed, hammered, or rolled into bars; or the temperature may be increased until the whole mass is melted, and the metal run into molds, thus converting the ores of iron directly into steel at one heating.

The inventor aforesaid does not claim passing over iron in a highly-heated state ordinary carbureted-hydrogen gas; but

What is claimed as his invention, and desired to be secured by Letters Patent, is—

1. In carrying the above-described method into effect, the use of gas surcharged with carbon by being passed through a carbonizing-vessel, as above described, and mixing or combining the gas so produced with hydrocarbon vapors, by any known means of producing that result.

2. In carrying the above-described method into effect, the use of other gases hereinbefore mentioned, when charged with hydrocarbon vapors.

3. In carrying the above-described method into effect, the use of atmospheric air charged with hydrocarbon vapors, by any known means of producing that result.

4. In carrying the above-described method into effect, the heating of heavy hydrocarbons to cause their vapors more readily to mix or combine with the gases or air, and be carried forward therewith.

5. Melting iron or the nitro-carbonized compound, after it has been converted into steel by the above-described method, and thereby converting it into cast-steel, as described.

6. In carrying the above-described method into effect, the use of hydrocarbon vapors without admixture with gas or air, as and for the purpose set forth.

7. In carrying into effect the method herein described of converting iron into steel, coating a portion of any piece of iron with a wash, as described, to prevent the portion so coated from being converted into steel.

8. Converting the oxides of iron directly into steel by one heating, by passing carbureted or carbonized hydrogen gas over and through the same, when in a highly-heated state, according to the method or process herein described.

THE BARRONS PATENT STEEL
MANUFACTURING COMPANY,
By NATHAN RANDALL, *President.*

Witnesses:
WILLIAM HILDRETH FIELD,
JAMES MYERS, Jr.